United States Patent
Greenwood et al.

(10) Patent No.: US 7,632,208 B2
(45) Date of Patent: Dec. 15, 2009

(54) CONTINUOUSLY VARIABLE TRANSMISSIONS

(75) Inventors: Christopher John Greenwood, Preston (GB); Andrew Damian Defrietas, Standish (GB); Brian Joseph Dutson, Tyldesley (GB); Ian David Cornwell, Penwortham (GB)

(73) Assignee: Torotrak (Development) Limited, Lancashire (GB)

( * ) Notice: Subject to any disclaimer, the term of this patent is extended or adjusted under 35 U.S.C. 154(b) by 524 days.

(21) Appl. No.: 10/499,925

(22) PCT Filed: Jan. 24, 2003

(86) PCT No.: PCT/GB03/00259

§ 371 (c)(1),
(2), (4) Date: Jun. 17, 2004

(87) PCT Pub. No.: WO03/062670

PCT Pub. Date: Jul. 31, 2003

(65) Prior Publication Data

US 2005/0009664 A1    Jan. 13, 2005

(30) Foreign Application Priority Data

Jan. 24, 2002    (GB) ................................. 0201628.5

(51) Int. Cl.
*F16H 15/38* (2006.01)
(52) U.S. Cl. .......................................... 476/40; 476/46
(58) Field of Classification Search ............... 476/40, 476/42, 46, 54, 67, 70; 384/535, 536, 551, 384/581, 582
See application file for complete search history.

(56) References Cited

U.S. PATENT DOCUMENTS 3,933,054 A * 1/1976 Iseman .......................... 476/8

(Continued)

FOREIGN PATENT DOCUMENTS

CH    345771    5/1960

(Continued)

OTHER PUBLICATIONS

PCT Notification of Transmittal of The International Search Report or The Declaration for PCT Counterpart Application No. PCT/GB03/00259 containing International Search Report, 10 pgs., (May 15, 2003).

(Continued)

*Primary Examiner*—William C Joyce
(74) *Attorney, Agent, or Firm*—Blakely, Sokoloff, Taylor & Zafman LLP

(57) ABSTRACT

A continuously variable ratio transmission unit having first and second discs mounted for rotation about a main axis, a toroidal cavity being defined between the discs by facing surfaces thereof and containing a plurality of rollers which serve to transmit drive from one disc to the other, each roller being coupled to a respective carriage through a respective bearing arrangement and each carriage being coupled at a first extremity to a first linear actuator and at a second extremity to a second linear actuator whereby the carriage is movable along a direction transverse to the main axis, the first and second linear actuators working in opposition to exert an adjustable net force on the carriage, the orientation of the carriage being constrained and the bearing arrangement being such as to enable the roller to rotate about a roller axis to thereby transmit drive from one of the discs to the other and also being such as to enable the roller axis to precess relative to the carriage to vary the transmission ratio.

24 Claims, 11 Drawing Sheets

U.S. PATENT DOCUMENTS

| | | | |
|---|---|---|---|
| 4,257,495 A | 3/1981 | de Brie Perry | |
| 4,524,641 A | 6/1985 | Greenwood | |
| 5,395,292 A | 3/1995 | Fellows et al. | |
| 5,423,727 A | 6/1995 | Fellows | |
| 6,071,209 A | 6/2000 | Greenwood | |

FOREIGN PATENT DOCUMENTS

| | | |
|---|---|---|
| DE | 934 447 | 10/1955 |
| DE | 198 26 381 A1 | 12/1999 |
| EP | 0 185 463 | 6/1986 |
| GB | 205655 | 10/1923 |
| GB | 258624 | 4/1927 |
| GB | 415922 | 9/1934 |
| GB | 625109 | 6/1949 |
| GB | 979062 | 1/1965 |
| GB | 1 002 479 | 8/1965 |
| GB | 2 227 287 A | 7/1990 |

OTHER PUBLICATIONS

PCT Written Opinion for PCT Counterpart Application No. PCT/GB03/00259, 6 pgs., (Sep. 22, 2003).

Patents Act 1977: Examination Report under Section 17 for United Kingdom Counterpart Application No. GB0201628.5, 3 pgs., (Apr. 11, 2002).

European Search Report for EP Application No. 04077587.6, 2 pgs., (May 11, 2005).

* cited by examiner

CONTINUOUSLY VARIABLE TRANSMISSIONS

CROSS-REFERENCE TO OTHER APPLICATIONS

This Application is a National Phase of International Application No. PCT/GB03/00259, filed on Jan. 24, 2003, which claims priority from Great Britain Patent Application No. 0201628.5, filed on Jan. 24, 2002.

BACKGROUND OF THE INVENTION

The present invention relates generally to continuously variable transmission units ("variators") of the toroidal-race rolling-traction type.

Major components of a known toroidal-race rolling-traction variator 10 of the "full toroidal" type are illustrated in FIG. 1. Here, two input discs 12,14 are mounted upon a drive shaft 16 for rotation therewith and have respective part toroidal surface 18, 20 facing toward corresponding part toroidal surfaces 22, 24 formed upon a central output disc 26. The output disc is journalled such as to be rotatable independently of the shaft 16. Drive from an engine or other prime mover, input via the shaft 16 and input discs 12, 14, is transferred to the Output disc 26 via a set of rollers disposed in the toroidal cavities. A single representative roller 28 is illustrated but typically three such rollers are provided in both cavities. An end load applied across the input discs 12, 14 by a hydraulic end loading device 15 provides contact forces between rollers and discs to enable the transfer of drive. Drive is taken from the output disc to further parts of the transmission, typically an epicyclic mixer, as is well known in the art and described eg. in European patent application 85308344.2 (published as EP 0185463). Each roller is mounted in a respective carriage 30 which is itself coupled to a hydraulic actuator 32 whereby a controlled translational force can be applied to the roller/carriage combination along a direction generally transverse to the main axis defined by the shaft 16.

The roller's motion can be broken down into three components:— i. a rotary bearing 35 of the carriage 30 allows the roller to rotate about its own axis of symmetry ("the roller axis") when driven by the associated input disc 12 or 14 and of course it is this rotary motion which transmits drive between the variator discs;

ii. in the prior art arrangement of FIG. 1 the piston 34 of the actuator 32 is capable of rotating within its cylinder, with consequent precession of the roller. That is, the carriage 30, piston 34 and roller 28 can rotate about an axis CA. The term "precession" in this context is used to refer to a rotation of the roller axis. Equivalently one may say that such precession involves a change in the inclination of the roller. The axis CA about which the roller precesses is referred to as the "castor axis"; and iii. the roller/carriage can move translationally along a direction circumferential to the main axis as the piston 34 moves along its cylinder. In such translational motion the roller centre is constrained to follow the centre circle of the torus defined by the variator discs, since to depart from this circle would mean forcing the discs further apart against the end load.

As the skilled person is aware, the aforesaid precession of the roller about the castor axis changes the relative diameters of the paths traced out by a roller on its associated input and output discs, thereby changing the variator transmission ratio. It can be seen in FIG. 1 that the castor axis CA, determined by the positioning of the actuator 32 relative to the discs 12, 26, is at an angle C to a plane which is normal to the main axis. This angle C is the "castor angle" and has an important effect on variator control. When the variator is running, the effect of the discs upon the roller is to urge it toward an orientation in which the roller axis intersects the main axis, as is well known to those skilled in the art. Translational movement of the roller along the circumferential direction, eg. due to a change in force applied by the actuator 32, tends to move the roller axis away from intersection with the main axis. However such translational movement is accompanied by precession of the roller about the castor axis which, by virtue of the castor angle, brings the roller axis back into intersection with the main axis and hence to a stable position.

The FIG. 1 variator is of "torque control" type. The (controllable) force applied to each roller by its associated actuator 32 must for equilibrium be balanced by the reaction forces exerted on the roller by the adjacent discs. The net force exerted on the roller by the discs is proportional to the so-called reaction torque. Consequently the rollers automatically move and precess to positions in which they serve to transmit a torque determined by the actuator forces. The principle is well known in the art.

Some further variator design issues must be understood in order to appreciate the present invention in all its different embodiments.

The magnitude of the castor angle affects variator performance. A small castor angle can result in the variator being under damped, giving the rollers a tendency to overshoot the equilibrium position and oscillate undesirably. The geometry illustrated in FIG. 1 imposes a limit on the castor angle related to the diameter of the discs and their separation. While an appropriate castor angle is achieved in known variators of this type, greater design freedom would be available if this limit could be avoided.

The bulk of the variator and its exterior shape are highly important since it must typically be installed in the limited space available within a motor vehicle engine bay. Practical embodiments of the FIG. 1 arrangement have had "lobes" projecting at the exterior of the variator casing to accommodate the actuators 32 which, being of double acting type, (with working chambers on either side of the pistons) are unavoidably lengthy and which have had to be positioned radially outward of the discs. These lobes can create difficulties in fitting the variator into a vehicle. More generally, it has long been recognised that the variator design has a large volume of empty space within it which serves no useful purpose, in the toroidal cavities between the discs, and that it would be advantageous to put this space to use in order to reduce total variator volume: where the rollers are controlled by linear actuators such as hydraulic pistons, this has up to now proven to be challenging.

There have been variators in which the rollers were controlled by means of an opposed pair of single acting pistons, one at either end of the roller carriage, each received in a respective cylinder. The pistons and cylinders in such arrangements lay on a common axis (the castor axis) angled to the radial plane (the angle in question being the castor angle) to enable rotation of the roller. Here again, however, the actuators lay radially outward of the discs creating a bulky, irregularly shaped package.

A further design consideration is referred to herein as "axial compliance". Under the considerable axial force applied by the end loading device 15, which is varied in operation in relation to the reaction torque, the toroidal faces 18, 20 of the discs move in a direction along the main axis, largely due to compliance in the discs, their mountings, the shaft etc. Such compliant movement of the discs can be of the order of 1 mm. The rollers 28 must be capable of some corresponding movement along the direction of the main axis along with the disc faces. This movement is straightforwardly provided in the FIG. 1 arrangement by slight angular movement of the piston 34 in its cylinder. Providing the required axial movement in the type of arrangement referred to above, in which each roller is arranged between a pair of actuators, is less straightforward.

A final design consideration concerns take-off of drive from the variator. This can be by means of a chain running on gear teeth formed on the radially outer surface of the central disc 26. However it is preferable in some contexts (particularly where the transmission is to be used in a rear or four wheel drive vehicle) to arrange for drive to be taken from the central disc to a component lying on the main axis. This type of "co-axial drive" can be very compact and it is desirable to provide for it in a simple manner.

In the course of a prior art review conducted prior to filing for a patent, the applicant has become aware of GB patent number 1002479, filed in 1964, published Aug. 25, 1965. Disclosed therein is a variator whose rollers are mounted to roller carrying "arms" in a manner which allows the roller axes to precess relative to the arms to alter the variator transmission ratio. However the variator in question is of a type in which all three rollers are to be actuated by means of a common central sleeve, rotation of which displaces the arms 42 and hence the rollers. Such arrangements proved impractical. To achieve "equalisation"—ie to ensure that all of the rollers, actuated by the common sleeve, arranged themselves to run at the same ratio required mechanical arrangement which proved unsatisfactory.

SUMMARY OF THE INVENTION

In accordance with a first aspect of the present invention there is a continuously variable ratio transmission unit having first and second discs mounted for rotation about a main axis, a toroidal cavity being defined between the discs by facing surfaces thereof and containing a plurality of rollers which serve to transmit drive from one disc to the other, each roller being coupled to a respective carriage through a respective bearing arrangement and each carriage being coupled at a first extremity to a first linear actuator and at a second extremity to a second linear actuator whereby the carriage is movable along a direction transverse to the main axis, the first and second linear actuators working in opposition to exert an adjustable net force on the carriage, the orientation of the carriage being constrained and the bearing arrangement being such as to enable the roller to rotate about a roller axis to thereby transmit drive from one of the discs to the other and also being such as to enable the roller axis to precess relative to the carriage to vary the transmission ratio.

In accordance with a second aspect of the present invention there is a roller and bearing assembly for a rolling-traction continuously variable transmission unit wherein the roller has an outer periphery for running on a pair of transmission races to transmit drive from one to the other and comprises a hoop for bearing compressional force applied to the roller by the transmission races, the bearing comprising a rotary bearing disposed within the roller hoop and having inner and outer bearing races, a coupling between the roller hoop and the bearing serving to rotatably mount the roller upon the bearing and to accommodate deformation of the roller hoop due to the compressional force without corresponding deformation of the outer bearing race.

BRIEF DESCRIPTION OF THE DRAWINGS

Specific embodiments of the present invention will now be described, by way of example only, with reference to the accompanying drawings in which:—

DETAILED DESCRIPTION OF THE INVENTION

Figure 1:
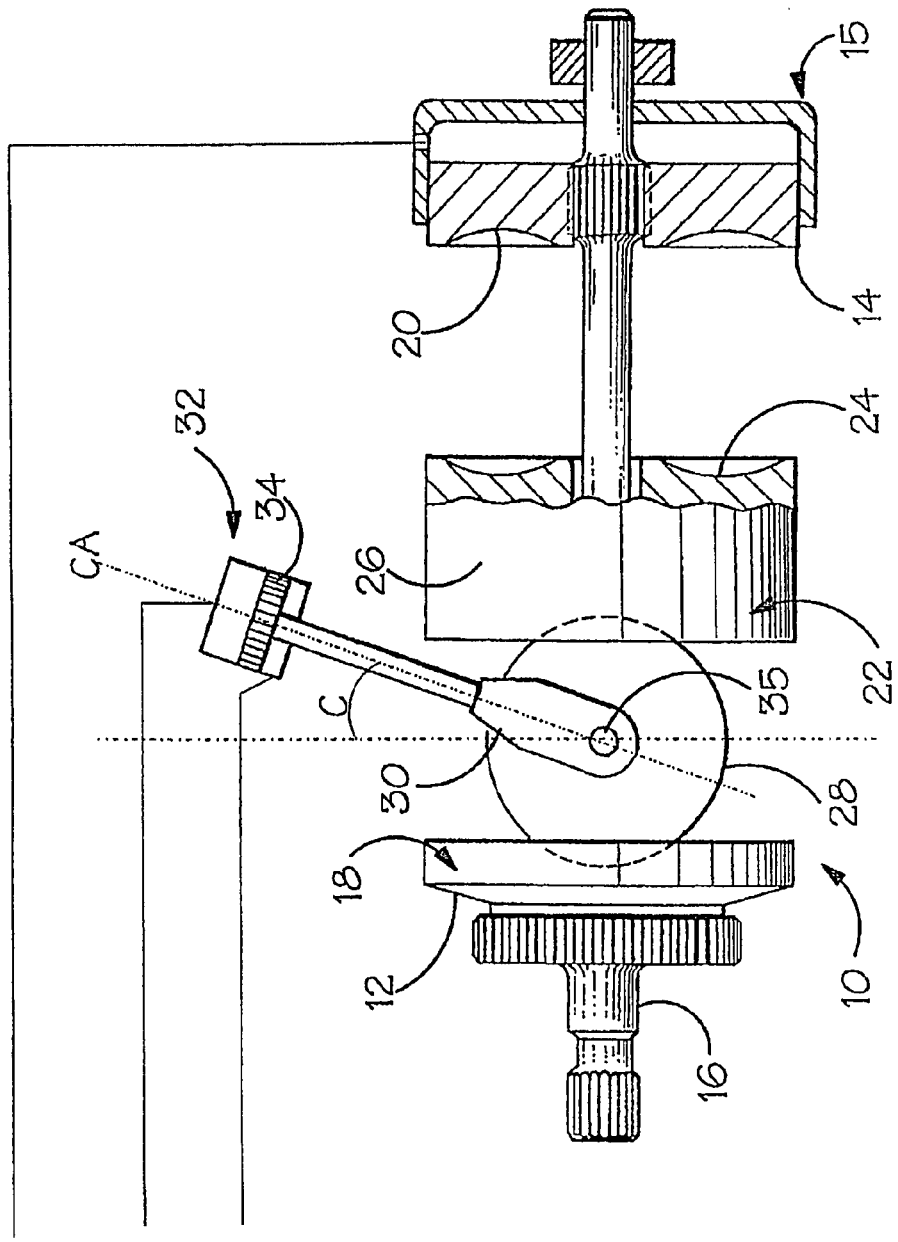
FIG. 1 is a simplified view of a known type of variator along a radial direction.

FIGS. 2 to 6 serve to make clear certain aspect of the geometry of a variator embodying the present invention and have been simplified for the sake of clarity. Each of these drawings shows only a single variator disc 100 and a single roller 102 although of course a further disc must be present in practice (and more typically three more discs to define two toroidal cavities, as in FIG. 1) and the, or each, cavity contains a set of rollers spaced about the cavity, three rollers per cavity being typically provided.

In the illustrated arrangement each roller 102 is mounted in a carriage 104 comprising a tangentially extending limb 106 lying radially inboard of the roller (with respect to a main axis defined by a main shaft 108). Both ends of the limb 106 carry a respective piston 110, 112 and both pistons are received in a respective cylinder 114, 115. The cylinders are of course housed in a variator casing, not itself shown The rollers are each mounted through a bearing arrangement on a stem 116 projecting from the carriage limb 106 in a generally radially outward direction. The bearing arrangement will be described in detail below.

Figure 6:
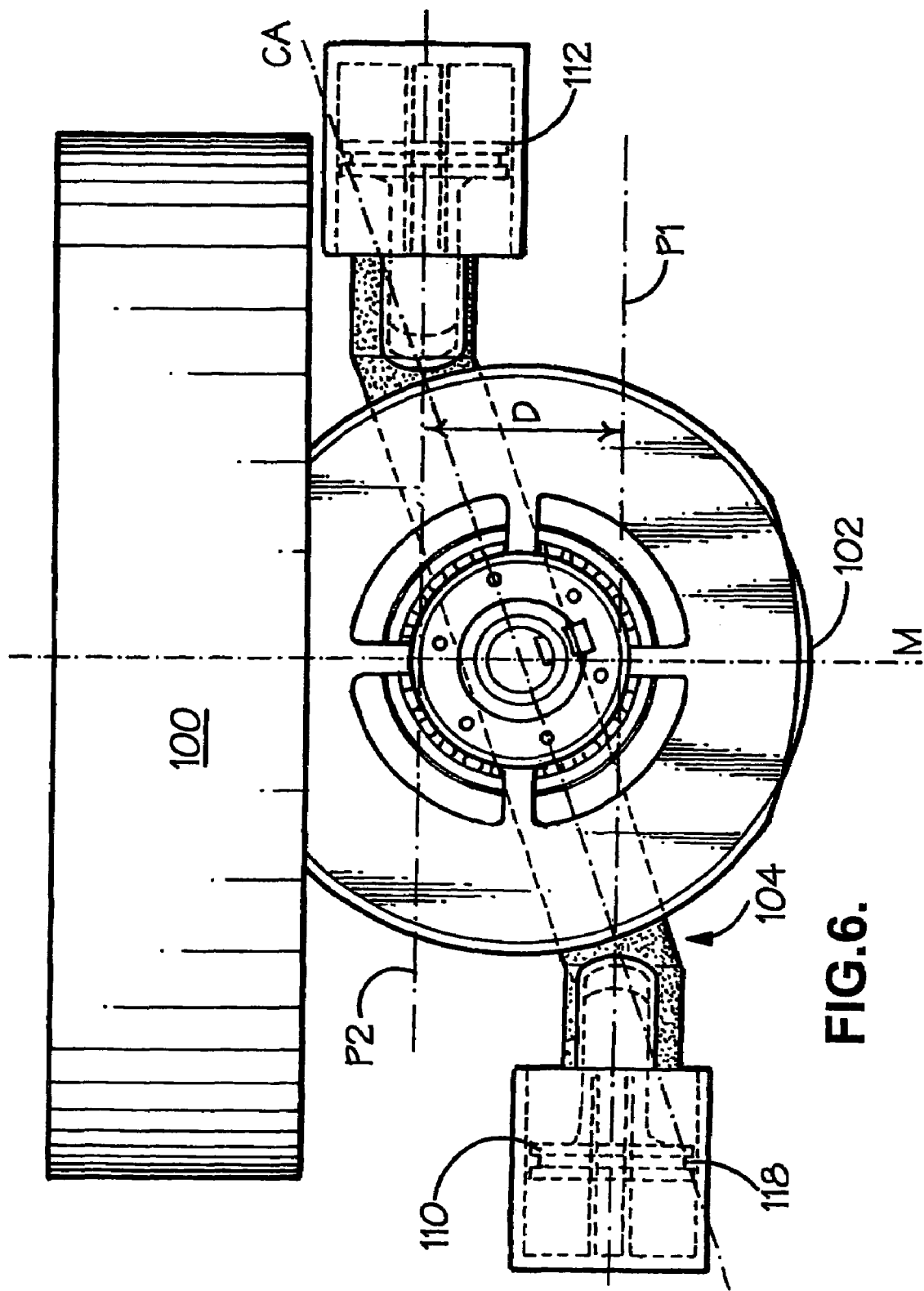
FIG. 6 is a plan illustration of the same components.

Looking at FIG. 6 it will be appreciated that both pistons 110, 112 have axes P1 and P2 lying in planes perpendicular to the main axis. However the pistons are not aligned with each other. Instead one piston is displaced a distance D along the direction of the main axis M from the other. This axial displacement is highly favourable from a packaging point of view, as will become clear. Despite the relative axial displacement of the two pistons 110, 112, the whole assembly of the pistons 110, 112 and the carriage 104 connected thereto is capable of limited rotation, this being about a carriage axis which is not indicated in FIG. 6 (it can be seen at PA in FIG. 2) and which joins the centres of both pistons. Such rotation of the piston/carriage assembly involves some skewing of the pistons in their cylinders, since the said carriage axis is not parallel to the piston axes, but this can be accommodated by virtue of sealing rings in circumferential grooves 118 through which the pistons seal against the cylinders. In an alternative embodiment (not shown) such limited rotational motion of the carriage can be provided for by connecting the carriage to both pistons through respective articulated joints, such as ball and socket joints.

Figure 2:
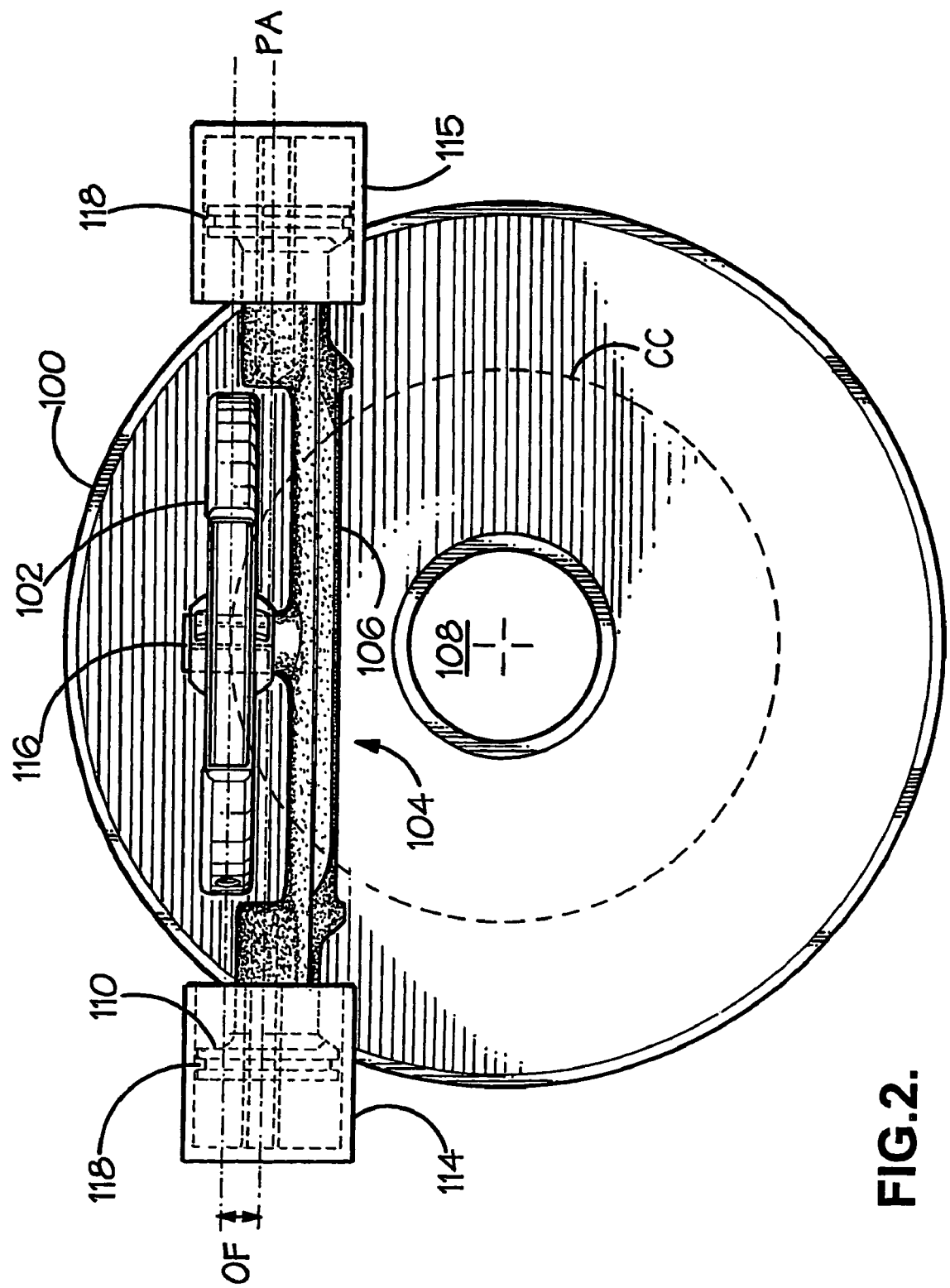
FIG. 2 is a simplified view along a main axis of some major components of a variator embodying the present invention.
Figure 5:
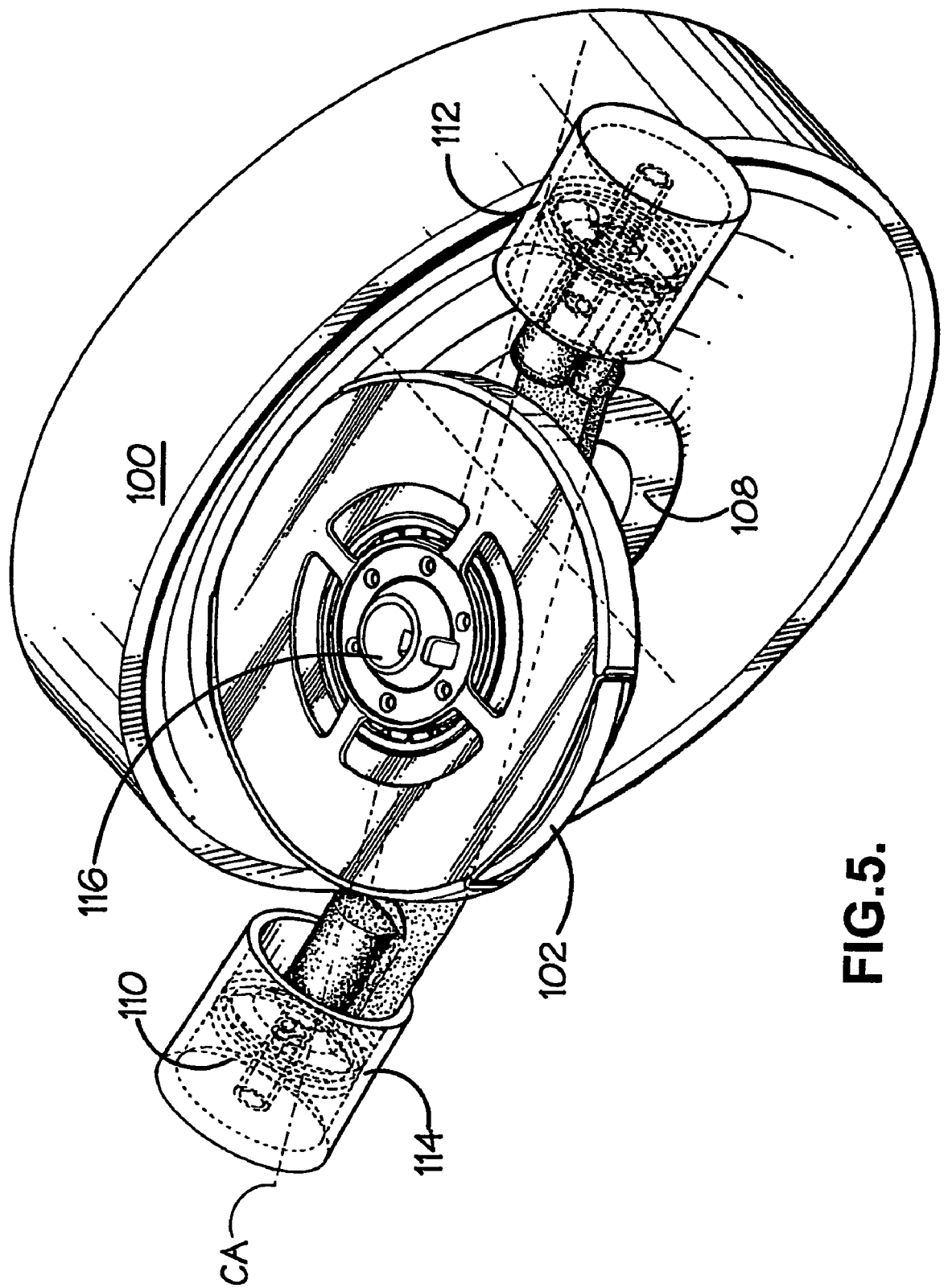
FIG. 5 is a perspective illustration of the components seen in FIGS. 2 to 4.

The aforesaid rotational movement of the carriage 104 is in any event severely constrained by the interaction of the roller 102 with the variator discs, as will now be explained with particular reference to FIG. 2. In that drawing the carriage axis is indicated at PA, passing through the centres of both pistons 110, 112. A dotted line CC represents the centre circle of the torus defined by the variator discs, one of which is seen at 100. The position of the centre circle is best seen in FIG. 5. The centre of the roller 102, as has been noted above, lies on the centre circle CC of the torus defined by the variator discs.

Note that the carriage axis PA is offset along a radial direction from the roller, and hence from the centre circle CC. The offset is indicated at OF in FIG. 2. In the illustrated embodiment the carriage axis PA is offset radially inwardly from the roller which is advantageous from a packaging point of view. Nonetheless a functional variator could be produced in which the offset direction was reversed—ie. the carriage axis PA was radially outward of the roller.

Due to the radial offset, any rotation of the carriage 104 about the carriage axis PA causes the centre of the roller 102 to be moved along a direction generally parallel to the main shaft 108. However, as was pointed out above, the centre of the roller 102 must always coincide with the centre circle of the torus defined by the variator discs 100. Hence any rotational movement of the carriage 104 about its axis PA is severely constrained. In fact the rotational position of the carriage about the carriage axis is dictated by the position of the variator discs 100. As pointed out above, the position of the discs 100 is subject to slight change. Under the variator end load, the discs can move slightly along the direction of the main shaft 108. Such movement of the discs is accompanied by a corresponding movement of the rollers 102 along the same direction and this is accommodated in the illustrated embodiment by virtue of slight rotational movement of the carriage 104 about the carriage axis PA. Hence the radial offset provides the required "axial compliance" in the roller position and at the same time constrains the carriage's rotational position.

Figure 3:
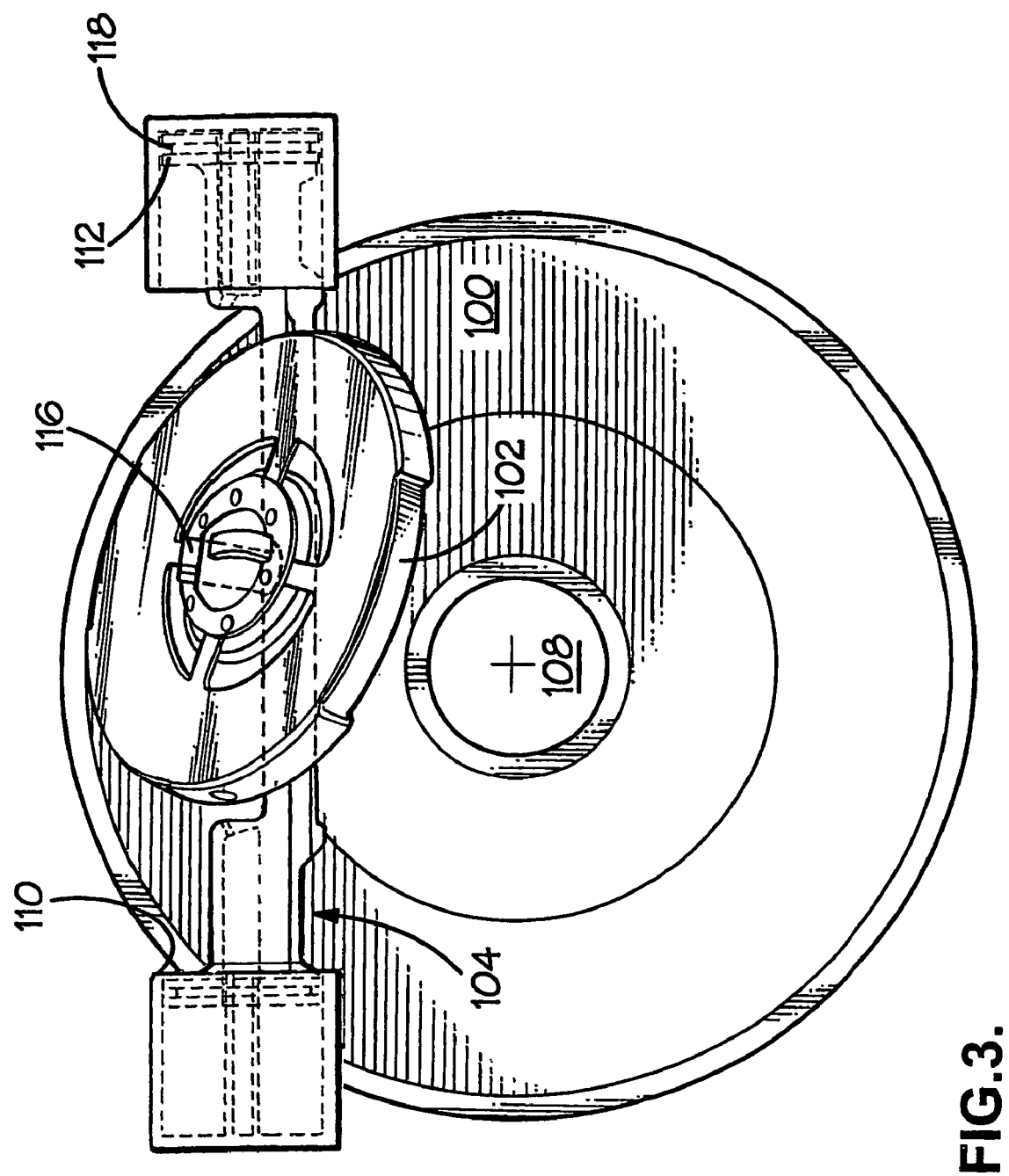
FIG. 3 corresponds to FIG. 2 but shows a roller/carriage combination of the variator at one extremity of its travel.
Figure 4:
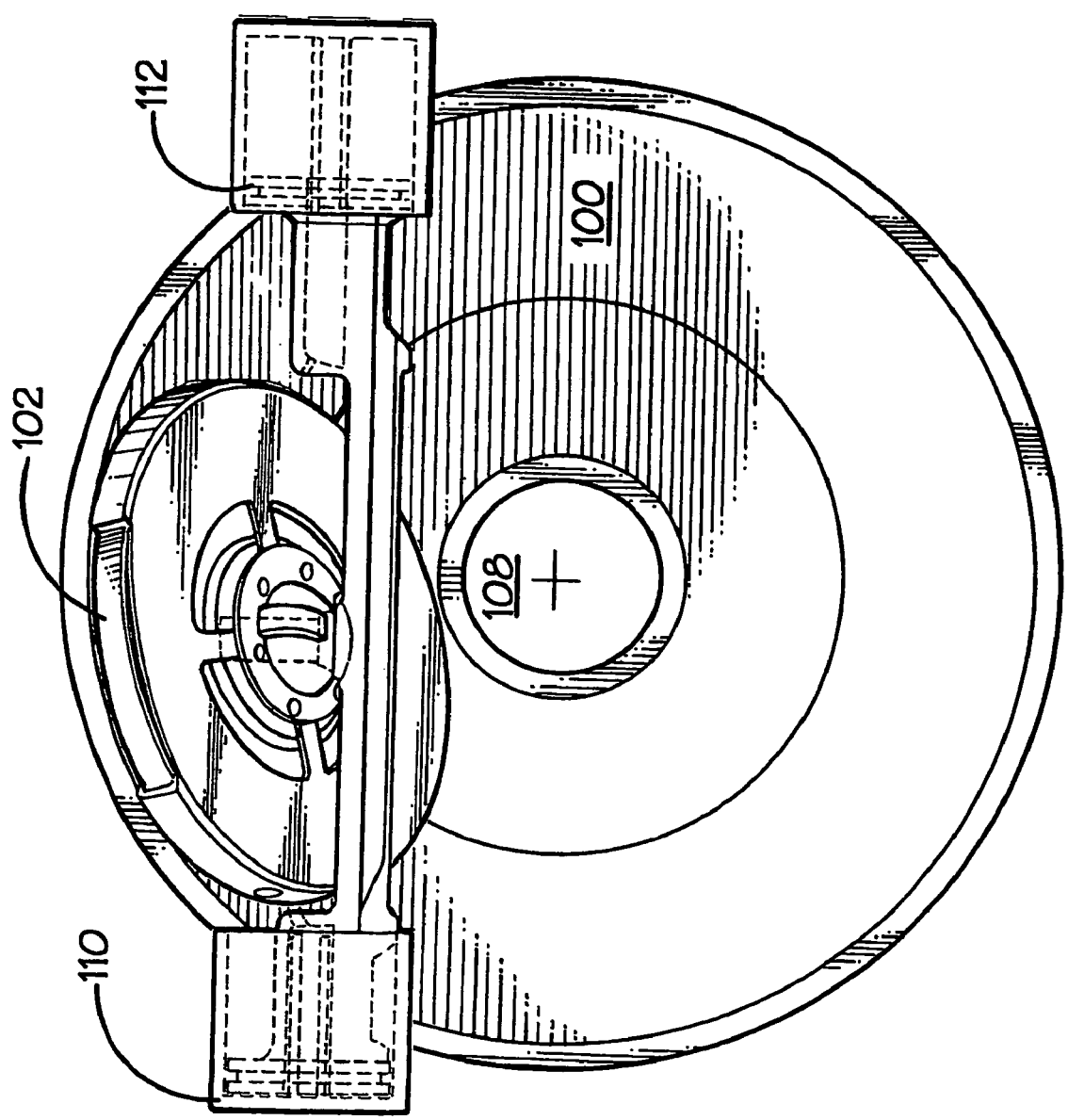
FIG. 4 corresponds to FIGS. 2 and 3 but shows the roller/carriage combination at the opposite extremity of its travel.
Figure 7:
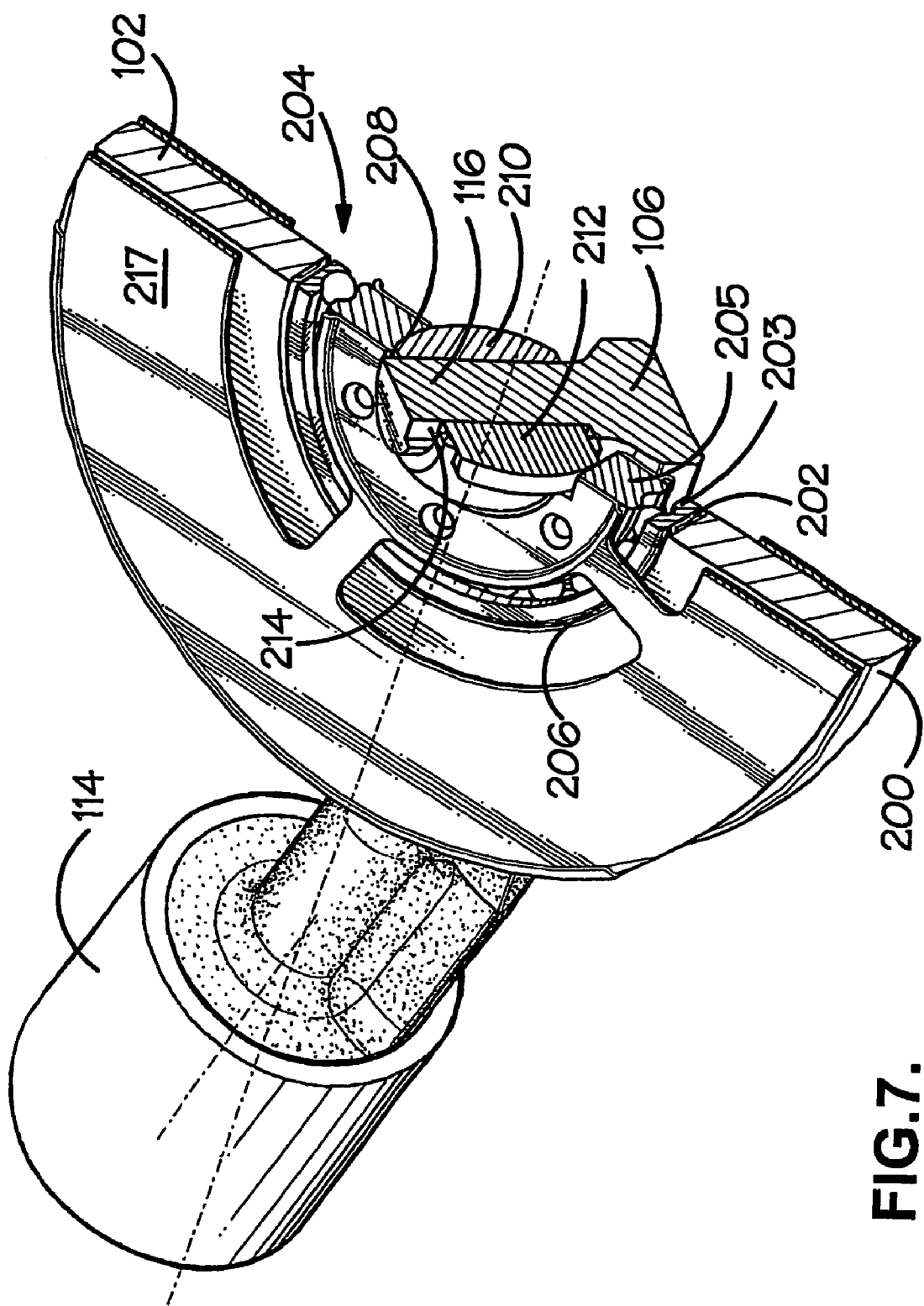
FIG. 7 is a perspective illustration of one half of a roller/carriage assembly for use in a variator embodying the present invention, a section through the roller and an associated bearing arrangement being exposed.

In the prior art arrangement illustrated in FIG. 1 the precession of the roller axis required to alter the variator transmission ratio is made possible by virtue of the freedom of the roller and carriage 28, 30 together to rotate about the castor axis defined by the actuator 32. However in the present embodiment this approach, of having the roller and carriage rotate together to change the angle of the roller axis, is not possible since the carriage's rotational position is constrained by virtue of the offset OF. Instead the bearing arrangement through which the roller 102 of the present embodiment is mounted upon the carriage 104 allows the roller to precess relative to the carriage to alter the angle of the roller axis. The principle will be clear from a comparison of FIGS. 2, 3 and 4 showing the roller/carriage assembly at different positions in its travel. The orientation of the carriage 104 is unchanged throughout but the angle of the roller axis—and of course of the roller itself—is altered to correspondingly alter the variator transmission ratio. The bearing arrangement which makes possible this precession of the roller 102 relative to its carriage 104 will now be described with reference to FIGS. 7 and 8. Certain components shown in these drawings are to be seen also in FIGS. 2 to 6 and the same reference numerals are used for these throughout The roller 102 is seen in FIG. 7 to have a circular outer surface 200 which of course runs on the variator discs and a circular inner surface 202 coupled to an outer race 203 of a rotary bearing 204 of the ball-race type through a resilient spacer 206. The function of the spacer 206 will be explained below. The inner race 205 of the rotary bearing 204 has a circular opening at its centre, thus providing an inner surface which can be seen at 208 to be shaped to form part of a sphere. The inner surface 208 rides upon a ball 210 to form a ball and socket joint which mounts the rotary bearing 204 (and hence the roller 102 itself). The ball 210 in turn is mounted upon the stem 116 projecting Cin a direction generally radially outward from the axis of the variator's main shaft) from the carriage limb 106.

The ball and socket joint 208, 210 allows the required precession of the roller's rotational axis (the axis of the rotary bearing 204). Note however that this precession is constrained by virtue of a tongue 212 projecting outward from the ball 210 and received in a corresponding slot formed in the part spherical surface 208 of the inner race 205. Additionally, the orientation of the tongue 212 is fixed relative to the carriage by virtue of a keyway 214 formed upon the stem 116 which engages with an adjoining, inner portion of the tongue 212 to prevent the ball 210 and tongue 212 from rotating about the stem. The effect is to allow the roller (or equivalently its rotational axis) to precess only about a chosen "castor" axis perpendicular to a main face 216 of the tongue.

Figure 8:
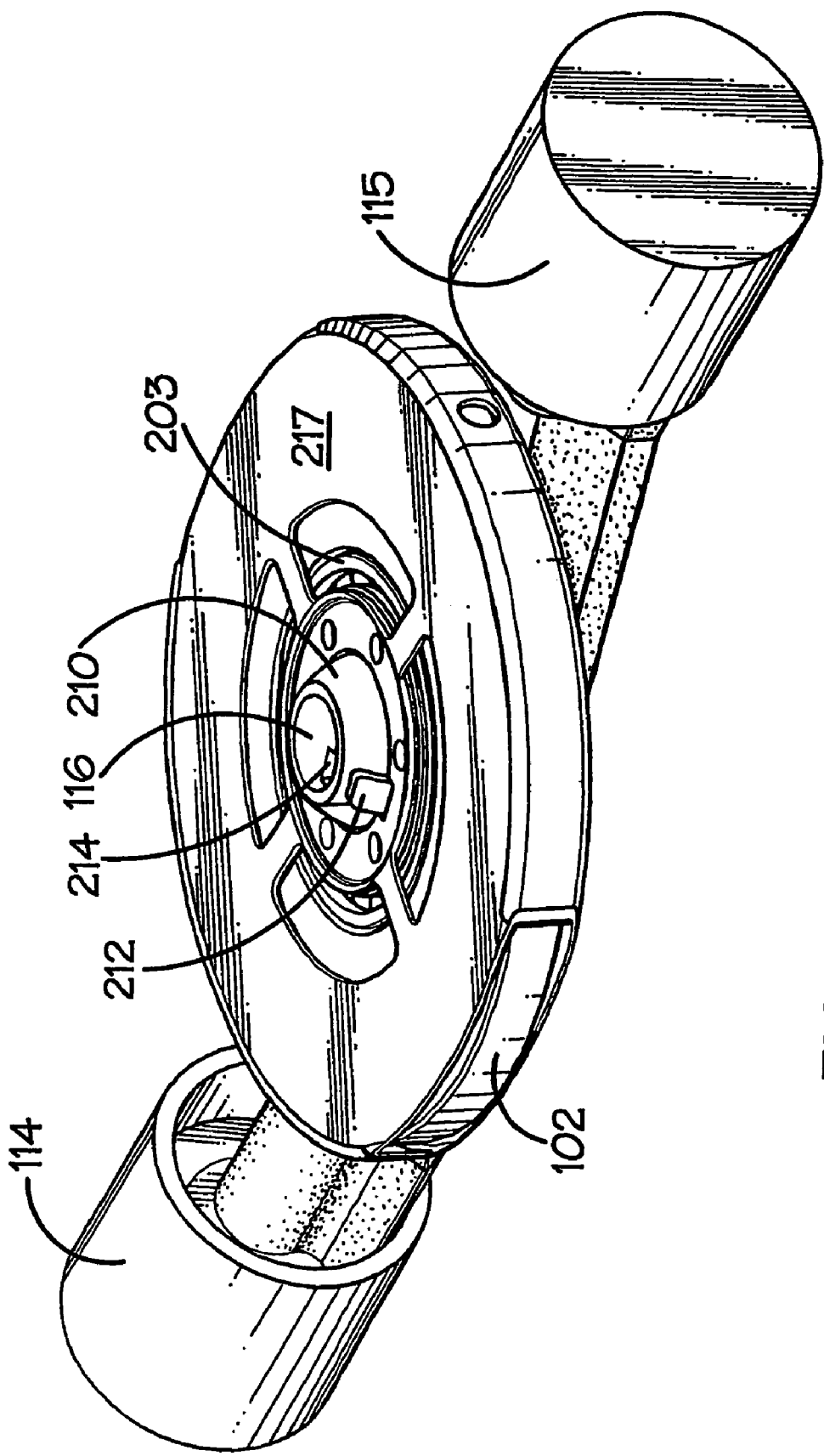
FIG. 8 is a perspective illustration of the roller/carriage assembly.
Figure 9:
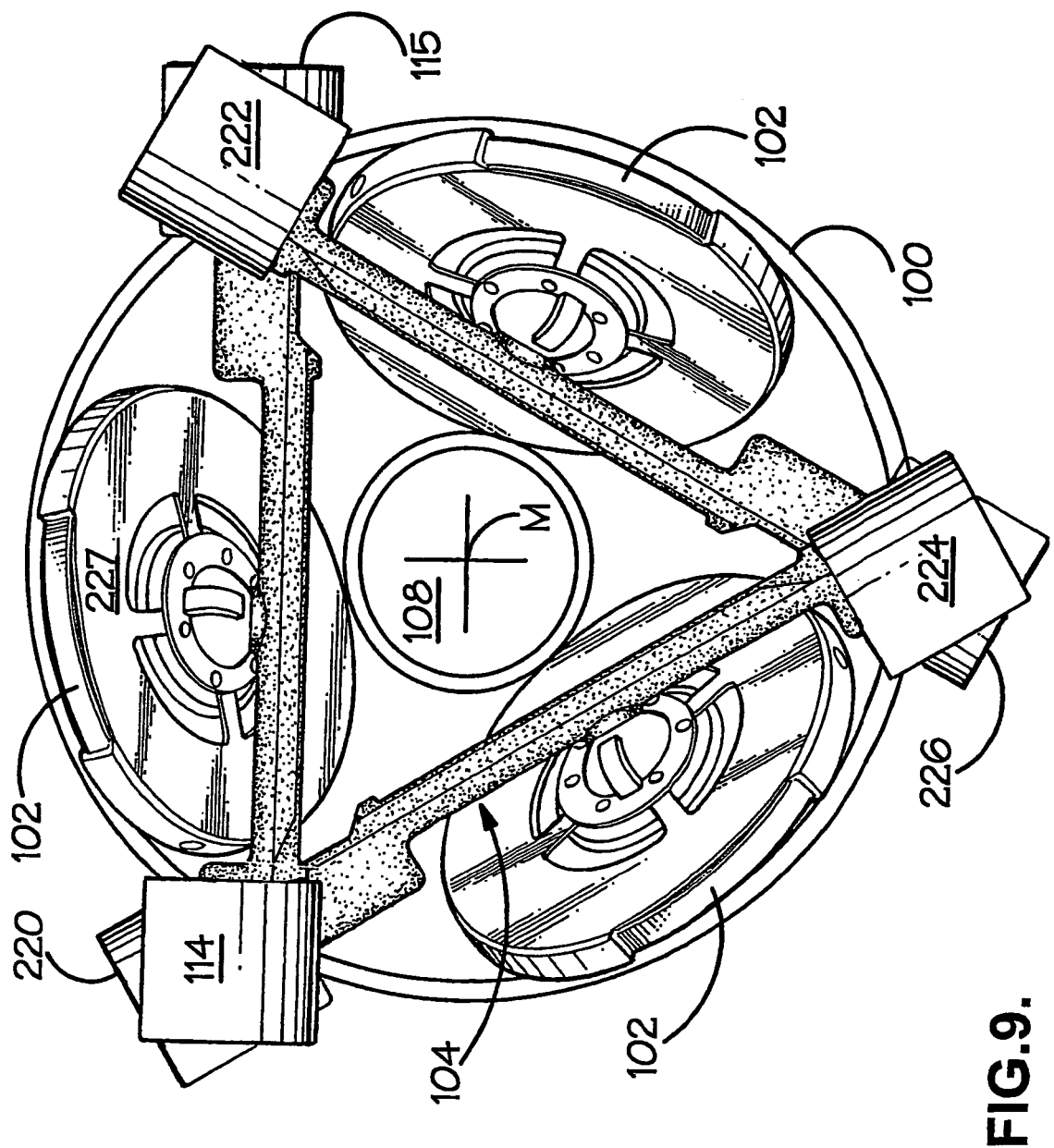
FIG. 9 is a view of major components of the variator along the direction of a main variator axis.

In FIGS. 7, 8 and 9 it can be seen that the rollers 102 are partially surrounded by respective shrouds 217. These are used to facilitate provision of oil fluid (referred to as "traction fluid") to the rollers. The roller is thereby cooled and a film of the fluid is maintained on the roller surface, between the variator discs and the rollers. As the skilled person is aware, drive is transmitted through this fluid film by virtue of shear thereof.

To explain now the function of the resilient spacer 206, it must be appreciated that in operation the two variator discs acting on the roller 102 exert a large compressive force along a diameter of the roller, tending to deform it somewhat such as to reduce the roller's outer (200) and inner (202) diameters along this direction If this compressive force were transmitted to the rotary bearing 204 and to the ball and socket joint 208, 210, the effect would be to cause them to tend to bind Wear on the rotary bearing 204, and frictional losses therein, would be undesirably increased. To avoid this problem, in the illustrated embodiment the roller 102 itself can be understood to form a hoop bearing the compressive force. The spacer 206 interposed between the roller and the bearing arrangement couples one to the other but accommodates the aforesaid deformation of the roller hoop due to the compressive force without transmitting this force to the bearing arrangement. The spacer may be formed as a band of corrugated spring steel. Such components, referred to as "tolerance rings", are known in themselves for use e.g. in mounting gears in situations where a radial loading on a bearing must be constant despite thermal expansion effects.

Turning back to FIG. 5, the castor axis defined by virtue of the tongue 212 can be seen at CA. The roller's axis (not itself indicated in the drawing) always lies in a plane perpendicular to the castor axis, despite precession of the roller. Note that the castor axis is inclined by an angle CA to a plane which is perpendicular to the axis of the variator's main shaft. This angle is the "castor angle" whose significance has been explained above. Because the castor angle is determined simply by the construction of the roller bearing arrangement (or specifically, in the illustrated embodiment, by the orientation of the tongue 212) it can be chosen to be whatever value is most desirable from the point of view of variator function. A large castor angle, unachieveable with the prior art arrangement of FIG. 1, may be chosen for the increased damping of the roller motion thereby provided.

It will be understood that as the pistons 110,112 move along their cylinders 114,115 the carriage is moved along a straight line. However such movement of the carriage must be accompanied by movement of the centre of the roller along a curved path, since the roller centre follows the centre circle of the toroidal cavity. Hence some movement (float) of the roller centre relative to the carriage must be provided for and this is done in the illustrated embodiment by allowing the ball 210 freedom to move slightly up and down the stem 116, as explained above.

It has been noted above that the illustrated arrangement of the roller, carriage and associated actuators is beneficial with regard to compact packaging of the variator. The reasons for this will now be explained with particular reference to FIG. 9 in which all three of the rollers 102 in one cavity of the variator are seen along with their associated components. Six hydraulic cylinders are indicated at 114,115,220,222,224 and 226. Note that adjacent pairs of cylinders such as 114 and 220 overlap, as viewed along the direction of the main axis. One is placed next to the other and the two cylinders of such a pair are displaced from each other along a direction generally parallel to the main axis. This overlapping relationship is made possible by the relative axial displacement D of the two cylinders acting on a particular carriage 104. It allows the positions of the cylinders to be moved radially inwardly, as compared with previous variator arrangements, to reduce the size of any "lobes" needed at the exterior of the variator casing to accommodate the cylinders. Furthermore the cylinders can be seen to lie partly within the cavity between the first variator disc 100 and its counterpart disc (not seen). In earlier variators using "double ended" hydraulic actuators (as described in the description of the prior art above) the castor angle was dictated by the positions of the cylinders and placing the cylinders between the discs would consequently have undesirably limited the castor angle. This difficulty does not arise in the illustrated arrangement because the castor angle is instead defined relative to the carriages 104. In addition the result of the radial offset OF (FIG. 2) is to move the cylinders all toward the main axis M and so again reduce their projection. Thus by placing the cylinders at least partly within the toroidal cavities the bulk of the variator is reduced.

Figure 10:
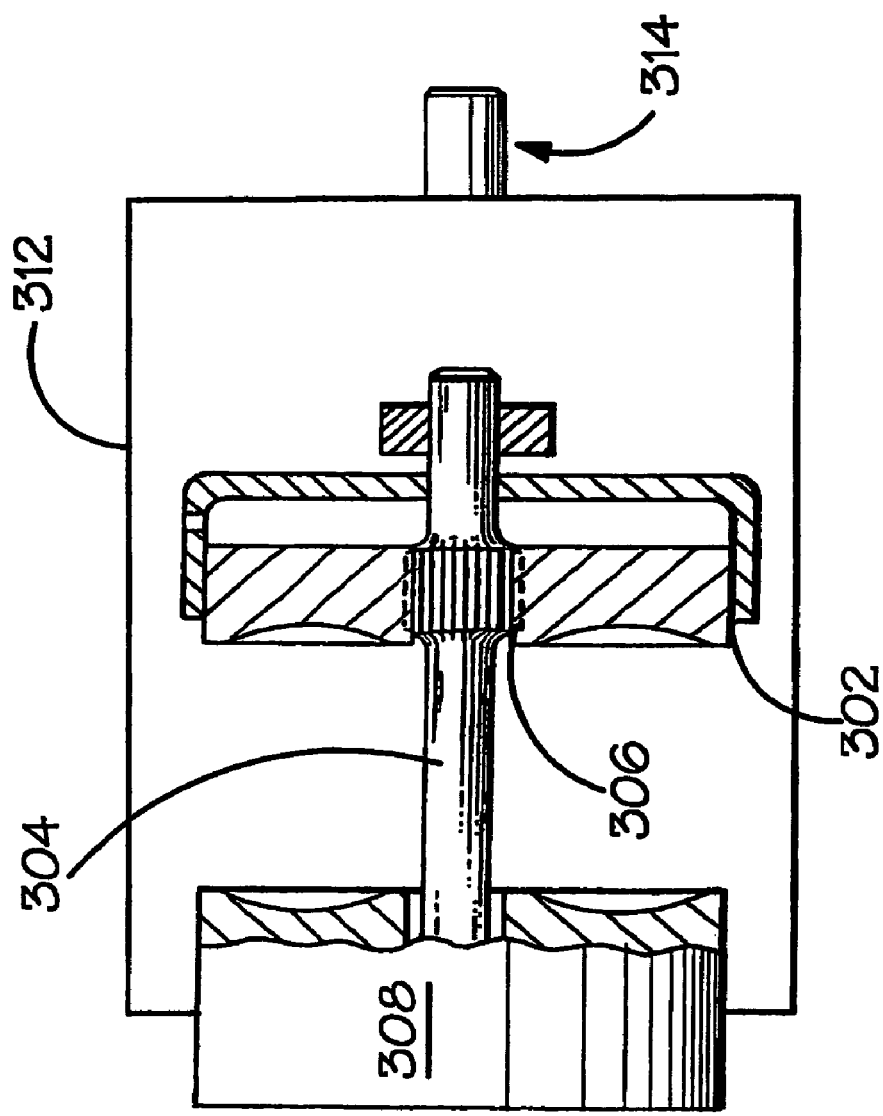
FIG. 10 is a simplified view of a variator embodying aspects of the present invention.
Figure 10:
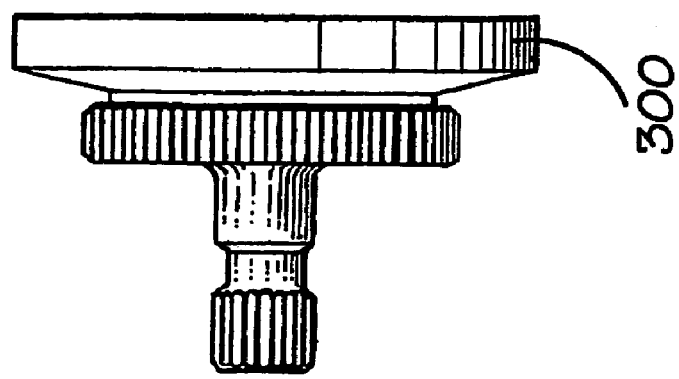

FIG. 10 illustrates in schematic form an arrangement for take-off of drive from the variator. In this arrangement the two outer variator discs 300,302 are splined or keyed to the main shaft 304 as indicated at 306. It is necessary also to take drive from the inner disc assembly 308. This can be done through a chain engaged with the exterior of the disc assembly 308, in a manner which will be familiar to the person skilled in the art. However it is desirable for some variator installations instead to take off drive through a component which rotates about the main variator axis defined by the shaft 310. A particularly straightforward way to achieve this is, as shown in FIG. 10, to couple to the inner disc assembly 308 a rotor formed as a drum 312 which lies radially outward of the variator discs and extends along the axial direction to a region 314 beyond the outer disc 302. Further gearing, not illustrated but typically of epicyclic type, can be engaged to the drum 312 in this region.

This type of power take off arrangement has long been recognised by the applicant as desirable—and has indeed been implemented in earlier prototype variators not using linear actuators to control the individual rollers—but has hitherto been impractical in connection with rollers utilising such actuators since the radial projection of the roller control cylinders in earlier such arrangements meant that the diameter of the drum 312 required to clear the cylinders was excessive. While the cylinders are omitted from FIG. 10 it is to be understood that they are constructed and arranged as hereinbefore described with reference to FIGS. 2 to 9. As a result their radial projection is minimised and the diameter of the drum 312 need not be excessive.

The aforegoing embodiment is presented by way of example only and various possible modifications within the scope of the present invention will no doubt present themselves to the skilled reader. For example the radial offset OF could in other embodiments (not illustrated) be dispensed with. In such embodiments the orientation of the carriages carrying the rollers could be constrained in some other way, eg by forming the piston/cylinder arrangements with a key and keyway or a non-circular cross section to prevent rotation of the pistons. In such embodiments some alternative way would typically be needed to provide the required axial compliance in the roller position and this could be done by giving the bearing arrangement some lateral "float" relative to the carriage.

Whereas the axes of the roller actuators, seen at P1 and P2 in FIG. 6, are in radial planes in the illustrated embodiment and do not intersect, it would be possible to orientate both actuators on a common axis, inclined to the radial plane.

The illustrated bearing arrangement is considered particularly well adapted to the technical requirements but here again other constructions are possible. For example to define the castor axis it would be possible, in place of the tongue and slot arrangement illustrated in FIG. 7, to utilize a pin aligned with the castor axis and passing through the ball and socket so that relative rotation of the ball and socket is possible only about the axis defined by the pin.

Figure 12:
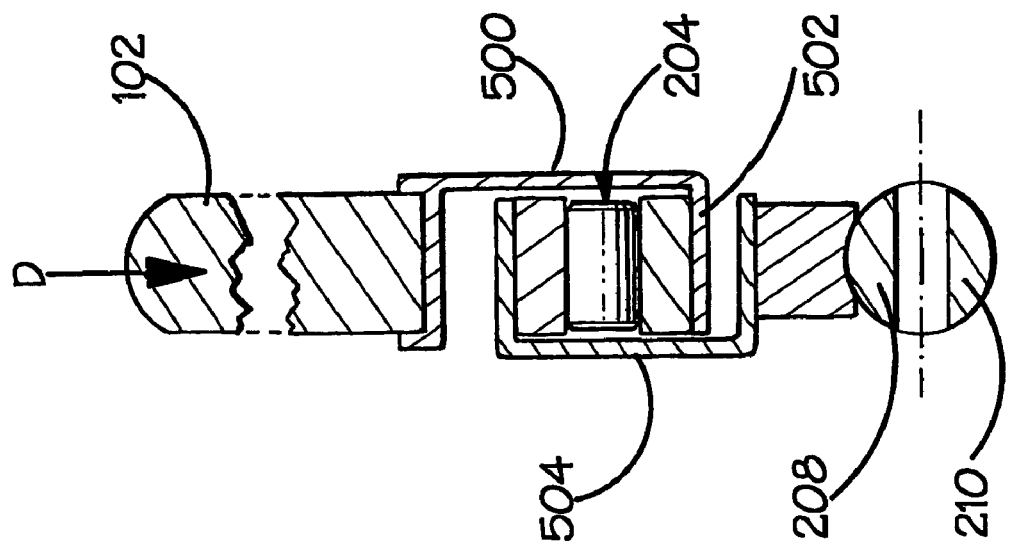
FIGS. 11 and 12 are sectional views, in an axial plane, of roller/bearing arrangements embodying aspects of the present invention.
Figure 11:
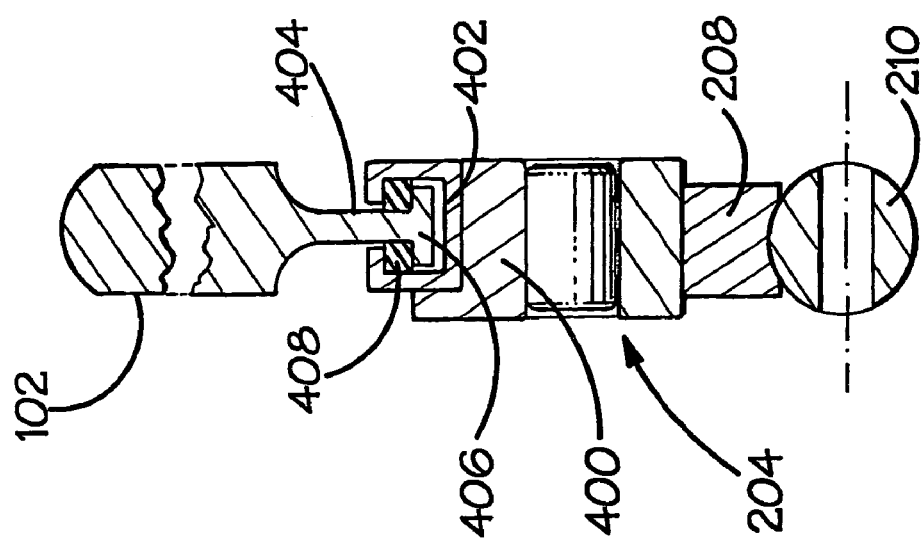

FIGS. 11 and 12 illustrate two possible alternative constructions of the roller and its associated bearing. In both cases the arrangement serves to effectively isolate the bearing from the compressional loading applied to the roller by the variator discs. As before the roller itself is indicated at 102, the rotary bearing upon which the roller is journalled at 204 and the ball and socket joint allowing precession of the roller at 208, 210.

In FIG. 11 the outer race 400 of the rotary bearing 204 bears a radially outwardly open channel 402 receiving a radially inwardly projecting lip 404 of the roller. The lip is captive within the channel due to a flange 406 within the channel and is coupled to it through a resilient band 408. Deformation of the roller thus causes the lip to be driven further into the channel 402 but this movement is accommodated without corresponding deformation of the outer race 400.

In FIG. 12 a lip 500 projects radially inward from the roller 102 and terminates in a flange 502 coupled to the inner race of the bearing 204. The beaing's outer race is coupled to the socket 208 through a ring 504. When the roller is radially inwardly deformed by pressure thereupon, along the direction of arrow D, the flange 502 and the bearing's inner race are correspondingly inwardly deformed but since the space between the bearing races is thereby increased the bearing's function is not impaired The bearing is not required to bear the compressional load applied to the roller.

The invention claimed is:

1. A roller and bearing assembly for a rolling-traction continuously variable transmission unit wherein the roller has an outer periphery for running on a pair of transmission races to transmit drive from one to the other and the roller comprises a hoop for bearing compressional force applied to the roller by the transmission races, the bearing being disposed within the roller hoop and having inner and outer bearing races, a coupling provided between the roller hoop and the bearing serving to rotatably mount the roller upon the bearing and to accommodate deformation of the roller hoop due to the compressional force without corresponding deformation of the bearing.

2. A roller and bearing assembly as claimed in claim 1 further comprising a pivotal mounting through which the assembly is mountable on a roller carriage, the pivotal mounting being such as to enable precession of the roller axis relative to the carriage.

3. A roller and bearing assembly as claimed in claim 2 wherein the pivotal mounting comprises a ball and socket disposed within the bearing.

4. A roller and bearing assembly as claimed in claim 3 wherein a control member is provided which projects from one of the ball and socket into the other allowing relative rotation of the ball and socket only about a castor axis.

5. A roller and bearing assembly as claimed in claim 4 wherein the control member comprises a tongue projecting from one of the ball and socket and being received in a slot in the other of the ball and socket the tongue being capable of sliding along the slot to allow relative rotation of the ball and socket.

6. A roller and bearing assembly as claimed in claim 3 wherein the inner race has an inner surface which is shaped to form the socket and is thereby mounted upon the ball.

7. A roller and bearing assembly as claimed in claim 6 mounted upon a roller carriage through a stem received in the ball, the ball being capable of movement along the stem to accommodate displacement of the roller relative to the carriage.

8. A roller and bearing assembly as claimed in claim 1 wherein the coupling comprises a resilient band through which the bearing is coupled to the roller hoop.

9. A roller and bearing assembly as claimed in claim 1 wherein the roller hoop is mounted through the coupling on the inner race of the bearing.

10. A rolling-traction continuously variable transmission unit having first and second races mounted for rotation about a main axis, a toroidal cavity being defined between the races by facing surfaces thereof and containing at least one roller having an outer periphery for running on the races to transmit drive from one to the other, the roller comprising a hoop for bearing compressional force applied to it by the races, and a bearing being disposed within the roller hoop and having inner and outer bearing races, a coupling being provided between the roller hoop and the bearing serving to rotatably mount the roller hoop upon the bearing and to accommodate deformation of the roller hoop due to the compressional force without corresponding deformation of the outer bearing race.

11. A continuously variable transmission unit as claimed in claim 10 further comprising a pivotal mounting through which the bearing is mounted on a roller carriage, the pivotal mounting being such as to enable precession of the roller axis relative to the carriage.

12. A continuously variable ratio transmission unit as claimed in claim 11 wherein the pivotal mounting comprises a ball and socket disposed within the bearing.

13. A continuously variable ratio transmission unit as claimed in claim 12 wherein a control member is provided which projects from one of the ball and socket into the other allowing relative rotation of the ball and socket only about a castor axis.

14. A continuously variable ratio transmission unit as claimed in claim 13 wherein the control member comprises a tongue projecting from one of the ball and socket and being received in a slot in the other of the ball and socket the tongue being capable of sliding along the slot to allow relative rotation of the ball and socket.

15. A continuously variable ratio transmission unit as claimed in claim 10 wherein the coupling comprises a resilient band through which the bearing is coupled to the roller hoop.

16. A roller and bearing assembly for a rolling-traction continuously variable transmission unit wherein the roller has an outer periphery for running on a pair of transmission races to transmit drive from one to the other and the roller comprises a hoop for bearing compressional force applied to the roller by the transmission races, the bearing being disposed within the roller hoop and having inner and outer bearing races, a coupling provided between the roller hoop and the bearing serving to rotatably mount the roller upon the bearing and to accommodate deformation of the roller hoop due to the compressional force without corresponding deformation of the bearing, a pivotal mounting through which the assembly is mountable on a roller carriage, the pivotal mounting comprises a ball and socket disposed within the bearing and being such as to enable precession of the roller axis relative to the carriage.

17. A roller and bearing assembly as claimed in claim 16 wherein a control member is provided which projects from one of the ball and socket into the other allowing relative rotation of the ball and socket only about a castor axis.

18. A roller and bearing assembly as claimed in claim 17 wherein the control member comprises a tongue projecting from one of the ball and socket and being received in a slot in the other of the ball and socket, the tongue being capable of sliding along the slot to allow relative rotation of the ball and socket.

19. A roller and bearing assembly as claimed in claim 16 wherein the inner race has an inner surface which is shaped to form the socket and is thereby mounted upon the ball.

20. A roller and bearing assembly as claimed in claim 19 mounted upon a roller carriage through a stem received in the ball, the ball being capable of movement along the stem to accommodate displacement of the roller relative to the carriage.

21. A roller and bearing assembly for a rolling-traction continuously variable transmission unit wherein the roller has an outer periphery for running on a pair of transmission races to transmit drive from one to the other and the roller comprises a hoop for bearing compressional force applied to the roller by the transmission races, the bearing being disposed within the roller hoop and having inner and outer bearing races, a coupling provided between the roller hoop and the bearing serving to rotatably mount the roller upon the bearing and to accommodate deformation of the roller hoop due to the compressional force without corresponding deformation of the bearing, the roller hoop mounted through the coupling on the inner race of the bearing.

22. A rolling-traction continuously variable transmission unit having first and second races mounted for rotation about a main axis, a toroidal cavity being defined between the races by facing surfaces thereof and containing at least one roller having an outer periphery for running on the races to transmit drive from one to the other, the roller comprising a hoop for bearing compressional force applied to it by the races, and a bearing being disposed within the roller hoop and having inner and outer bearing races, a coupling being provided between the roller hoop and the bearing serving to rotatably mount the roller hoop upon the bearing and to accommodate deformation of the roller hoop due to the compressional force without corresponding deformation of the outer bearing race, and a pivotal mounting through which the bearing is mounted on a roller carriage, the pivotal mounting comprising a ball and socket disposed within the bearing and being such as to enable precession of the roller axis relative to the carriage.

23. A continuously variable ratio transmission unit as claimed in claim 22 wherein a control member is provided which projects from one of the ball and socket into the other allowing relative rotation of the ball and socket only about a castor axis.

24. A continuously variable ratio transmission unit as claimed in claim 23 wherein the control member comprises a tongue projecting from one of the ball and socket and being received in a slot in the other of the ball and socket, the tongue being capable of sliding along the slot to allow relative rotation of the ball and socket.

* * * * *

UNITED STATES PATENT AND TRADEMARK OFFICE
CERTIFICATE OF CORRECTION

PATENT NO. : 7,632,208 B2
APPLICATION NO. : 10/499925
DATED : December 15, 2009
INVENTOR(S) : Greenwood et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 740 days.

Signed and Sealed this

Second Day of November, 2010

David J. Kappos
*Director of the United States Patent and Trademark Office*